P. ARBOGAST.
Coating Wire, &c., with Glass.
No. 220,907. Patented Oct. 28, 1879.
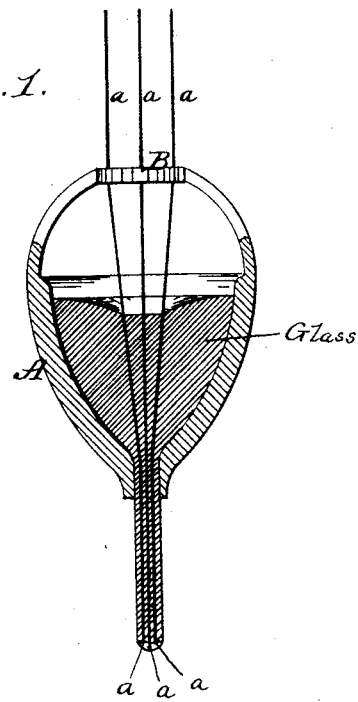
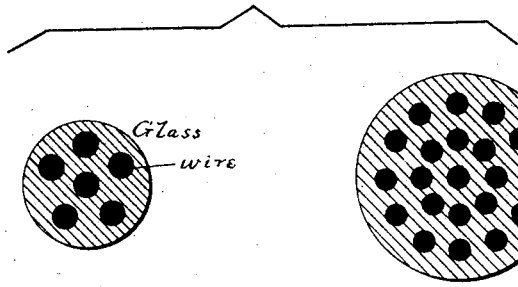
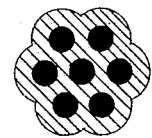
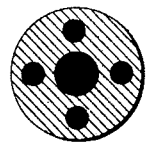
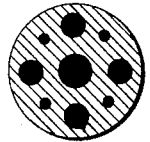

UNITED STATES PATENT OFFICE.

PHILIP ARBOGAST, OF PITTSBURG, PENNSYLVANIA, ASSIGNOR TO HIMSELF, JOHN M. PATTERSON, ANDREW HOWARD, H. C. VAN TINE, AND WILLIAM I. MILLER, OF SAME PLACE.

IMPROVEMENT IN COATING WIRE, &c., WITH GLASS.

Specification forming part of Letters Patent No. 220,907, dated October 28, 1879; application filed May 29, 1879.

*To all whom it may concern:*

Be it known that I, PHILIP ARBOGAST, of Pittsburg, in the county of Allegheny and State of Pennsylvania, have invented certain new and useful Improvements in the Process of Coating Wire, &c., with Glass and in the manufacture of glass-coated wires and cables; and I do hereby declare the following to be a full, clear, and exact description of the invention, such as will enable others skilled in the art to which it pertains to make and use it, reference being had to the accompanying drawings, which form a part of this specification, in which—

Figure 1 shows the method of making. Figs. 2, 3, and 4 are sectional views of the product.

This invention relates to a method and apparatus for coating wires or cables with glass or other vitreous covering to protect them from the atmosphere, or to insulate them for electrical use, or for any other purpose to which such coating makes the wires or cables applicable.

It consists, broadly, in inserting one or more wires or cables into a solid mass of hot and plastic glass, griping the end or ends of said wire or cable, and drawing them through the mass of glass while the latter remains stationary, whereby the glass, being molten, works around any and all of the wires or cables, so that it is drawn out with the wires and forms a complete coating of each and every one of them at one operation.

It consists, further, in drawing such conglomeration of wires and glass through a suitably-shaped die or dies, whereby the whole is given any desired cross-section.

It consists, further, in leading such wires into the mass of glass through a templet, whereby the wires are continuously preserved at the proper distance apart, which is determined according to circumstances.

It consists, further, in the product, as hereinafter described and claimed.

The machinery required to bring my invention into practice may take many different shapes, of which I illustrate one form in Fig. 1.

A designates a suitable vessel, provided with an overhead templet, B, which is perforated for the passage and guidance of the wires $a$, which may be of any number or disposition with reference to each other. The bottom of vessel A is fitted with a round or other shaped opening larger in area than the massed wires. The wires are first inserted through the templet B, then passed down through the vessel A, and through its die-opening. Then a mass of molten glass or other vitreous material is put into the vessel. Being molten, it works in and around all the wires $a$, and completely fills the space between them. Then the dependent ends of the wires are griped and drawn downwardly. The glass sticks to and follows the moving wires, and the die-bottom shapes it to whatever section may be desired.

To make the shape more perfect a second die may be used, to pass the whole through after it has cooled down somewhat.

Iron, copper, steel, or other wires or cables may be used, and the conglomerate mass may be made to any length desired, and, after making, may be cut to suitable sizes and annealed.

Instead of operating vertically the apparatus may be obviously arranged to draw out horizontally.

Any number of wires can be thus successfully coated with glass, and each shall be completely isolated from all the others, thus making it an admirable vehicle for underground telegraphy, or an excellent preservative of such wires for any use to which they may be applicable, such as chandelier-arms, umbrella-handles, lightning-rods, supporting-legs for stands, &c.

As instances of the forms it may take, I have in Fig. 2 plain cylinders of glass having five, six, and twenty-one wires, respectively.

In Fig. 3 I have a fluted cylinder formed by passing it through a fluting-die, whereby I acquire a given strength with less glass than if a solid cylinder were made. By running one wire to each flute it becomes easy to trace any given wire, where it is used as an electrical conductor.

In Fig. 4 is a cylinder having a thick wire at the center, and smaller wires, of two sizes, surrounding it in the vitreous cylinder.

I claim as my invention—

1. The method of coating wires or cables with vitreous material, consisting in inserting the wires into a solid mass of molten vitreous material, and then drawing either the wires or mass of vitreous matter away while the other remains stationary, whereby any number of wires can be simultaneously coated.

2. The method of forming rods of glass-coated wires or cables, consisting in first drawing said wires or cables through a solid mass of molten glass, and then causing the conglomerated wires and glass to pass through a suitable shaping-die, substantially as described.

3. The method of forming rods of glass-coated wires, consisting in passing said wires first through a suitable guide or templet, then through a solid mass of molten glass, and, finally, drawing the whole through a suitably-shaped die, substantially as described.

4. As a new article of manufacture, a fluted glass rod having metal wires or cables passing through the same from end to end.

In testimony that I claim the foregoing I have hereunto set my hand this 27th day of May, 1879.

PHILIP ARBOGAST.

Witnesses:
A. V. D. WATTERSON,
T. J. McTIGHE.